United States Patent [19]

Yee et al.

[11] Patent Number: 5,330,780
[45] Date of Patent: * Jul. 19, 1994

[54] CHEESE AND PROCES AND SYSTEM FOR MAKING IT

[75] Inventors: Jeng-Jung Yee; Jeffrey L. Kornacki; Rajagopalan Narasimhan, all of Green Bay, Wis.

[73] Assignee: Schreiber Foods, Inc., Green Bay, Wis.

[*] Notice: The portion of the term of this patent subsequent to Nov. 24, 2009 has been disclaimed.

[21] Appl. No.: 912,152

[22] Filed: Jul. 10, 1992

Related U.S. Application Data

[63] Continuation of Ser. No. 512,552, Apr. 23, 1990, Pat. No. 5,165,945, which is a continuation of Ser. No. 76,787, Jul. 23, 1987, abandoned.

[51] Int. Cl.$^5$ ............................................. A23C 19/028
[52] U.S. Cl. ..................................... 426/582; 426/36; 426/38; 426/40; 426/42; 426/520
[58] Field of Search ................... 426/582, 520, 42, 36, 426/38, 40

[56] References Cited

U.S. PATENT DOCUMENTS

| | | |
|---|---|---|
| 3,535,304 | 10/1970 | Muller et al. |
| 3,886,288 | 5/1975 | Rice et al. |
| 3,914,435 | 10/1975 | Maubois et al. |
| 4,205,090 | 5/1980 | Maubois et al. |
| 4,401,679 | 8/1983 | Rubin et al. |
| 4,689,234 | 8/1987 | Ernstrom et al. |
| 4,707,364 | 11/1987 | Barach et al. |

FOREIGN PATENT DOCUMENTS

| | | |
|---|---|---|
| 0065981 | 12/1982 | European Pat. Off. |
| 0120879 | 10/1984 | European Pat. Off. |
| 0174846 | 3/1986 | European Pat. Off. |
| 0174847 | 3/1986 | European Pat. Off. |

OTHER PUBLICATIONS

D. V. Rao and E. Renner, Studies on the Application of Ultrafiltration For the Manufacture of Cheddar Cheese, 43 Milchwissenschaft (1988) pp. 708-711.

John Lelievre and Robert C. Lawrence, Manufacture of Cheese From Milk Concentrated By Ultrafiltration, 55 Journal of Dairy Research (1988) pp. 465-478.

N. P. Wong, ed., Fundamentals of Dairy Chemistry, 3rd Ed., (1988) pp. 61-62.

A. Eck, ed., Cheesemaking Science and Technology, 2nd Ed., (1986) p. 161.

B. J. Sutherland and G. W. Jameson, Composition Of Hard Cheese Manufactured by Ultrafiltration, The Australian Journal for Dairy Technology (Dec. 1981) pp. 136-143.

Cheese Base for Processing. A High Yield Product From Whole Milk by Ultrafiltration, 63 J. Dairy Science (1980) pp. 228-234.

Kosikowski, F., Cheese and Fermented Milk Foods, Published by the Author (Kosikowski), Distributed by Edwards Brothers, Inc., Ann Arbor, Mich. (1969) pp. 204-205.

Whey and Whey Foods, (date and author unknown) pp. 451-458.

*Primary Examiner*—Helen Pratt
*Attorney, Agent, or Firm*—Willian Brinks Hofer Gilson & Lione

[57] ABSTRACT

A process for making cheese that can include soluble proteins, such as whey proteins, comprises the steps of renneting the feed stock, heating the renneted feed stock, then adding lactic cultures to the renneted and heat-treated feed stock, removing excess water to produce unfermented cheese and allowing fermentation to proceed to produce fermented cheese. Varied textures of the fermented cheese are achieved by adjusting the degree of the milk clotting enzyme (rennet) action on feed stock, the heat treatment to which the renneted feed stock is subjected, the amount of water removed and the de-watering process conditions. The fermented cheese can be texturized. This process is capable of producing cheese having solids contents from about 40 percent to above about seventy percent by weight. The resulting cheese can be used as natural cheese or as a natural cheese ingredient in the making of processed cheese.

21 Claims, 4 Drawing Sheets

CHEESE AND PROCES AND SYSTEM FOR MAKING IT

This application is a continuation of pending application Ser. No. 07/512,552 which was filed on Apr. 23, 1990, now U.S. Pat. No. 5,165,945 which in turn is a file wrapper continuation of application Ser. No. 07/076,787, filed on Jul. 23, 1987 and now abandoned.

BACKGROUND OF THE INVENTION

This invention relates to processes and systems for making food products from a feed stock that includes unrenneted casein and can include soluble proteins such as whey proteins. It also relates to food products obtained by such processes. In particular, this invention relates to cheese and cheese products which can incorporate soluble proteins, such as whey proteins.

A. Definitions of Terms

"Milk" means the lacteal secretion obtained by the milking of one or more females of a mammalian species, such as cow, sheep, goat, water buffalo, or camel. Broadly speaking, such milk is comprised of casein (a phospho-protein), soluble proteins, lactose, minerals, butterfat (milkfat), and water. The amount of these constituents in the milk may be adjusted by the addition of, or the removal of all or a portion of, any of these constituents. The term "milk" includes lacteal secretion whose content has been adjusted.

Milk obtained by milking one or more cows is referred to as "cows' milk". Cows' milk whose composition has not been adjusted is referred to herein as "whole milk". It is comprised of casein, whey proteins, lactose, minerals, butterfat (milkfat), and water. The composition of "cows' milk" can be adjusted by the removal of a portion of or all of any of the constituents of whole milk, or by adding thereto additional amounts of such constituents. The term "skim milk" is applied to cows' milk from which sufficient milkfat has been removed to reduce its milkfat content to less than 0.5 percent by weight. The term "lowfat milk" (or "part-skim milk") is applied to cows' milk from which sufficient milkfat has been removed to reduce its milkfat content to the range from about 0.5 to about 2.0 percent by weight.

The additional constituents are generally added to cows' milk in the form of cream, concentrated milk, dry whole milk, skim milk, or nonfat dry milk. "Cream" means the liquid, separated from cows' milk, having a high butterfat content, generally from about 18 to 36 percent by weight. "Concentrated milk" is the liquid obtained by partial removal of water from the whole milk. Generally, the milkfat (butterfat) content of concentrated milk is not less than 7.5 weight percent and the milk solids content is not less than 25.5 weight percent. "Dry whole milk" is whole milk having a reduced amount of water. It generally contains not more than five percent by weight of moisture on a milk solids not fat basis. "Nonfat dry milk" is the product obtained by the removal of water only from skim milk. Generally, its water content is not more than five weight percent and its milkfat content is not more than 1.5 weight percent.

Thus, the term "cows' milk" includes, among others, whole milk, low fat milk (part-skim milk), skim milk, reconstituted milk, recombined milk, and whole milk whose content has been adjusted.

The term "soluble proteins" means proteins that generally do not precipitate when a liquid (such as milk) containing such proteins is subjected to the conditions of a conventional cheese making process. Such proteins include, for example, whey proteins, soluble soybean proteins and egg white proteins.

The term "whey proteins" means cows' milk proteins that generally do not precipitate in conventional cheese making processes. The primary whey proteins are lactalbumins and lactoglobulins. Other whey proteins that are present in significantly smaller concentrations include euglobulin, pseudoglobulin, and immunoglobulins.

The term "feed stock" means a liquid which includes ingredients required to be present in cheese in required proportions, excluding water. However, the casein present in the feed stock is unrenneted casein, i.e. casein which has not been converted to paracasein. Such unrenneted casein includes native casein micelles, acid casein, sodium caseinate and calcium caseinate. The feed stock also may contain fat of dairy or non-dairy origin, soluble proteins, carbohydrates, minerals and vitamins.

The term "high solids cheese" refers to cheeses which have a solids content higher than sixty percent by weight. These cheeses have been usually referred to in the trade as hard cheese. The term "very high solids cheese" refers to cheeses which have a solids content higher than seventy percent. Such cheeses have been referred to in the trade as very hard cheese.

In the conventional manufacture of cheese, milk is processed to produce a semi-solid mass called "cheese curd" (or "curd") and a liquid (whey). The curd contains casein, a small amount of lactose, most of the butterfat, minerals, and water. The whey contains whey proteins,, most of the lactose, some of the butterfat, minerals, and water. The curd may be worked (e.g., stirred) and/or combined with certain flavor and taste producing ingredients, and/or ripened using bacteria to produce different varieties of "natural cheese".

One or more varieties of curd or natural cheese can be comminuted and mixed with an emulsifying agent to form, with the aid of heat, a homogeneous plastic mass called "processed cheese". Examples of processed cheese include: "process cheese" "process cheese food" "process cheese spread", and "process cheese product". The various types of processed cheeses are obtained depending on the processing conditions, the specific varieties of curds or natural cheeses used, and the additional ingredients added during the processing.

"Imitation cheese" is a food made in semblance of any natural cheese variety, processed cheese, or other foods made or natural or processed cheese, in which casein, caseinates, and/or safe or suitable non-milk ingredients, such as vegetable proteins, and vegetable oil, replace all or part of the nutritive milk components normally found in the food being simulated.

"Milk Clotting Enzymes" are those enzymes that are capable of coagulating milk. The term "renneting" refers to reaction on milk by a milk clotting enzyme.

"Unrenneted casein" refers to casein which has not been subjected to action of milk clotting enzymes.

B. The Problem this Invention Addresses

Natural cheese, such as Cheddar, stirred curd, Colby, Gouda, or Swiss, is made by coagulating milk that has been treated with suitable lactic acid producing bacteria to a suitable acidity, with appropriate milk clotting enzymes. The coagulum is cut and cooked resulting in curd and whey. The whey is drained from the curd, whereupon the curd may be Cheddared or stirred while additional acid is produced by fermentation of lactose to lactic acid in the curd. The curd may or may not be washed with water. If Cheddared, the curd is milled, whereupon it is salted and pressed into rectangular blocks or packed into barrels for maturing. The addition of lactic acid producing bacteria, ripening of the milk, cutting the curd, cooking the curd, stirring the curd, Cheddaring the curd and salting the curd are all controlled to yield a product in which the residual lactose and the unused buffer capacity of the curd are balanced so that complete fermentation of the residual lactose in the curd to lactic acid will result in a cheese having a pH suitable for market requirements, usually between 4.9 and 5.5.

The conventional processes for making natural and processed cheese utilize only casein. Whey proteins remain dissolved in the whey and are discharged as a by-product of the process. The whey proteins comprise about 14 to 24 weight percent of whole or skim milk's proteins and the nutritional value of the whey proteins is at least comparable to the nutritional value of casein. Accordingly, the loss of the whey proteins in the conventional cheese making processes limits the potential yields of such processes. The utilization of even a portion of the whey proteins in the manufacture of natural and processed cheeses is of great commercial importance.

Efforts have been made to design a process that would allow full utilization of the whey proteins in cheese making. One approach is to recover whey proteins from the whey by drying, condensing, ultrafiltration, or reverse osmosis of the whey. The recovered whey proteins are then combined with the cheese. Such processes are described, for example, in F. V. Kosikowski, *Cheese and Fermented Foods*, Edwards Brothers, Inc., Ann Arbor, Mich., 2 ed. 1977, pp. 451-458. A problem with this approach is that some countries have laws which prohibit, for most types of natural cheeses, recombining separately recovered whey proteins with the curd. For example, in the United States, whey proteins can be reincorporated into cheese curd only in making of certain natural cheeses, such as skim milk cheese. An additional problem associated with this approach is that the recovered whey constituents lack the physical and chemical characteristics required for making of natural cheese. For example, the dried whey proteins can be sprinkled into the cheese curd. However, only a limited amount of whey proteins can be added to cheese curd in this manner without changing its desired properties. Accordingly, the whey proteins recovered from whey are not used to any significant extent in commercial processes for making natural cheese. For these same reasons, whey proteins recovered in this manner are not used to any significant extent in the commercial manufacture of process cheeses. Moreover, it is commercially feasible to add only limited amounts of such recovered whey proteins to process cheese spreads, process cheese foods, process cheese products, or imitation cheeses.

Another approach for utilization of whey proteins in cheese making is to co-precipitate them with the casein. One process for obtaining co-precipitates of casein and whey proteins from milk is disclosed in U.S. Pat. No. 3,535,304 and in the corresponding Australian Patent No. 403,065 (hereinafter referred to as the Muller patents). The Muller patents specify that the product resulting from this process should find acceptance in some forms of baby food, ice cream, coffee whiteners, small goods, biscuits, bread, breakfast cereals, and canned processed foods. The final product of the Muller process lacks the "functionality" for making processed and imitation cheeses, i.e., it does not have the functional characteristics that are required for making such cheese. Another process for making cheese products from co-precipitates was developed by Schreiber Foods, Incorporated and described in U.S. patent application Ser. No. 202,237 filed on Oct. 30, 1980. This process produces cheese products having the required functionality but it requires an adjustment of the pH of milk prior to coagulation which may cause problems with governmental regulations in some countries.

A further approach for increasing the yields of cheese making processes by utilization of the whey proteins is by ultrafiltration of milk. It has previously been proposed to produce products suitable for conversion into cheese by altering the composition of whole or skim milk utilizing ultrafiltration or reverse osmosis. The milk is contacted with a membrane which permits the passage of water, lactose, and some minerals, but prevents the passage of casein, the whey proteins, butterfat and some minerals. The selective concentration of milk results in the formation of a retentate which contains whey proteins. When retentate is coagulated by acid or rennet, it forms a coagulum which contains the whey proteins. If this coagulum is then subject to syneresis, some of the whey proteins are lost in the expressed whey. One method for producing cheese by ultrafiltration of milk is disclosed in U.S. Pat. No. 4,204,090 (Maubois, et al.) and in Australian Patent Specification No. 477,399. According to this method, whole or skim milk is concentrated by ultrafiltration to about one fifth of this volume to give a product, sometimes called a "liquid pre-cheese", which is then manufactured by conventional means to give cheese. This method, however, is only suitable for making soft cheeses of the Camembert or Reblochon type and possibly, some semi-hard cheeses. It cannot be used to produce harder cheese of the Cheddar, Colby, or stirred-curd type, because the water content of the pre-cheese is too high and the ratio of buffer capacity to lactose will not give the desired final pH in the product.

In 1980 C. A. Ernstrom, B. J. Sutherland and G. W. Jameson published an article entitled "Cheese Base for Processing: A High Yield Product from Whole Milk by Ultrafiltration" in *Journal of Dairy Science*, Vol. 63, 228-234. In the process described in this article, the moisture content and pH of the final product is controlled to any desired level. The process results in a cheese base which has a moisture content and pH appropriate for use in place of conventionally made natural cheeses in the production of process cheeses. In the Ernstrom, et al. process, whole milk of normal pH or acidified to pH 5.7 is concentrated by ultrafiltration to 40% original milk weight and diafiltered at constant volume until a desired ratio of lactose to buffer capacity is established. The retentate is further concentrated by ultrafiltration to 20% of the original milk weight. The retentates are then inoculated with cheese starter and incubated to completely ferment the residual lactose. Precise control of final pH is achieved by controlling the level of lactose through diafiltration.

The fermented retentate is converted in a batch manner to cheese base in a swept-surface vacuum pan evaporator. The cheese base can be used to replace the unripened natural cheese component of processed cheese as it has the same pH and gross composition of Cheddar cheese. The use of the batch evaporator is necessitated by the fact that the retentate upon fermentation forms a curd or coagulum. Such a product cannot be readily processed in any continuous flow evaporator. Accordingly, the overall process of Ernsttom, et al. is essentially a batch process.

Subsequently, Jameson and Sutherland devised a continuous process for making cheese containing casein and whey proteins. This process has been commercialized by Schreiber Foods, Inc. It is described in European Patent Specification No. 0 065 981 published on Aug. 12, 1982. In the Jameson et al. process the ionic strength of the milk is increased so as to maintain the milk in the liquid state and to prevent the formation of any coagulum. The process includes the steps of selectively concentrating milk, fermenting the milk to produce a product having the solids composition as desired in cheese or cheese base and containing substantially all of the casein and whey proteins which were originally present in the milk and removing water from the product to achieve the desired moisture content. However, this process has not been commercially used to make high or very high solids cheese with varying texture as desired.

Another process developed by PASILAC for making cheese that incorporates whey protein by ultrafiltration is described in U.S. Pat. No. 4,401,679. This process includes the ultrafiltration and diafiltration of milk followed by inoculating the retentate with culture prior to evaporation and the subsequent fermentation of the cheese to a lower pH finished product. Since the evaporation of the retentate takes place at relatively high pH and the casein is not converted to paracasein by milk clotting enzyme (such as rennet) treatment, this process does not produce high solids hard cheese with the typical flavor, body and texture.

European Patent Application 0 174 847 published Mar. 19, 1986 describes another approach to making cheese which includes whey proteins. Briefly, the milk is converted by ultra and diafiltration into a retentate. The retentate is fermented without coagulation and contacted with a non-coagulating amount of milk clotting enzyme. The retentate is then evaporated to produce pre-cheese which is held at curing conditions to convert more than 65 percent of Kappa casein to para Kappa casein. The cured pre-cheese is texturized by mechanical working of the pre-cheese to produce cheese having acceptable texture. This texturization step can not take place until at least about 65% of the available Kappa casein is converted to para Kappa casein. This conversion is effected in about 3 days to 14 days after pre-cheese is removed out of evaporator. Therefore, the process is inefficient. The process is said to be capable of producing cheese having over 60% solids by weight.

The European Patent Application No. 0 174 846 published Mar. 14, 1986 describes a similar process except that the fermented retentate is maintained in a quiescent state during evaporation. The process is said to be capable of producing a cheese curd having solids content of more than about 50 percent by weight. This process is inefficient for the same reason in that it requires conversion of at least 65% of Kappa casein to para Kappa casein which requires from 3 to 14 days. Additionally, to achieve the well knitted texture, the cheese curd has to be pressed overnight and maintained in a 45° F. cooler for about 10 days.

Thus, the prior attempts have been unsuccessful in devising an efficient, economical, readily controllable, continuous process that can produce cheese that has varied textures and solid levels up to above 70% by weight and that can include high levels of soluble proteins. There is, therefore, an unsatisfied, long-felt need for such a process, products made by such process and system for making such products.

SUMMARY OF THE INVENTION

The process and system of the present invention are capable of producing cheeses with varied textures and having solids content in excess of about 70 weight percent in a continuous manner. Furthermore, such cheeses can include high levels of soluble proteins, such as whey proteins. The milk clotting enzymes are introduced to the feed stock containing cheese ingredients including unrenneted casein and soluble proteins, and the mixture is held for a time period needed for enzymatic reaction. The enzyme-treated feed stock is then heated. The degree of enzyme action and heat treatment to which the feed stock is subjected are selected to produce the desired body, texture, and solids level in the resulting cheese. Next, cultures are added to the thus treated feed stock and excess moisture is removed to make unfermented cheese. This unfermented cheese is then allowed to ferment to produce fermented cheese generally having the pH of less than about 5.5.

The fermented cheese can be texturized. The texturization can be effected any time after fermentation by heating the cheese to a temperature in the range of about 120° F. to about 170° F. and mechanical manipulation thereof. The texturization produces cheese having a firmer, more stringy texture.

Although salt can be added in the process of the present invention, salt addition is not required for continuous production of cheese. Accordingly, cheese containing soluble proteins, such as whey proteins, and having texture of traditional cheeses but having no salt or low levels of salt can be produced by the process of the present invention.

DETAILED DESCRIPTION OF THE INVENTION

A. General Description of the Process

The present invention relates to a process capable of continuous making high solids cheese with varying textures from feed stock containing unrenneted casein, soluble proteins and other cheese ingredients in the required proportions but including excess water.

Figure 1:
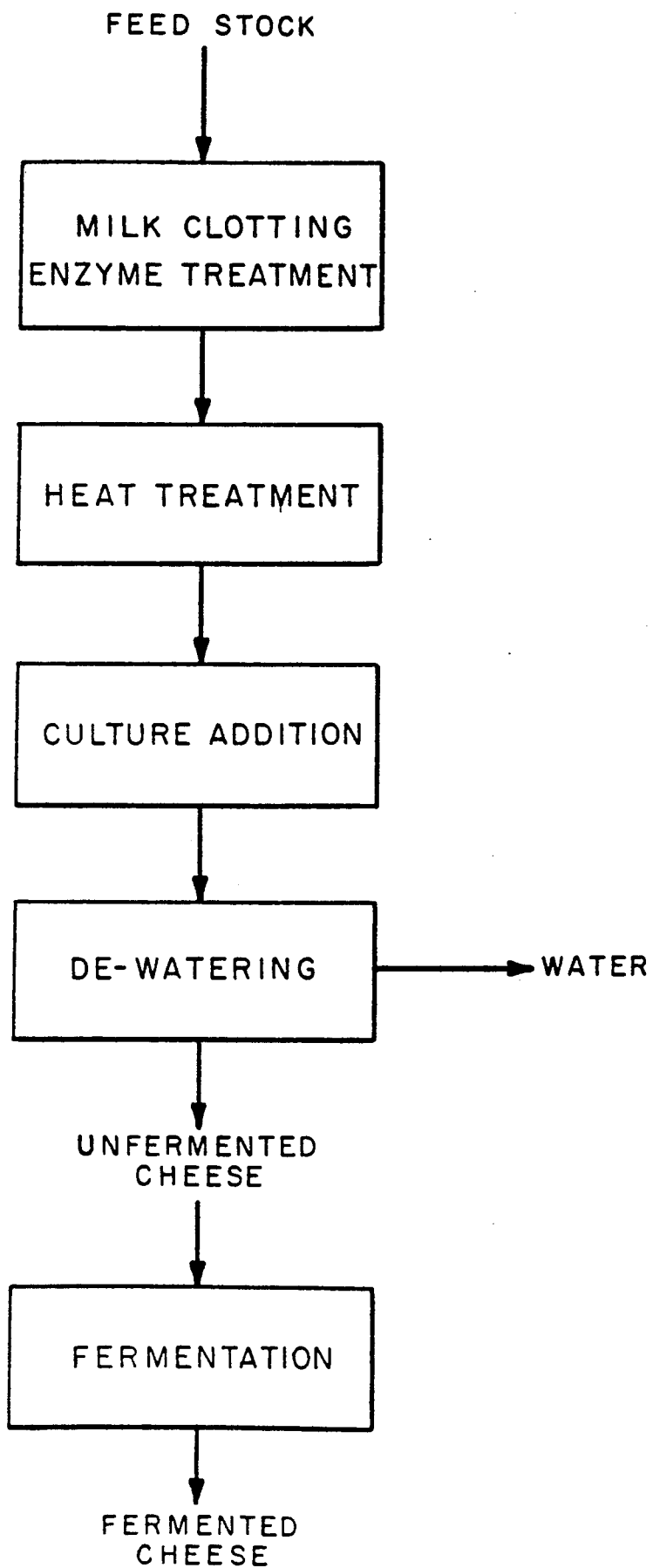
FIG. 1 depicts a simplified flow diagram of the process embodying the present invention.

The flow diagram of the process embodying this invention is depicted in FIG. 1. Generally, the feed stock is reacted with a coagulating amount of milk clotting enzyme. The resulting enzyme-treated feed stock is then heated at an elevated temperature and for a time period sufficient to substantially coagulate it and substantially deactivate said enzyme. Generally, the heating time period is in the range from about 0.1 second to about 600 seconds and the temperature is in the range from about 120° F. to about 300° F. Next, conventional cheese cultures are added to the thus treated feed stock and the feed stock is subjected to a de-watering step. In the de-watering step excess moisture is removed from the treated feed stock producing an unfermented cheese. This unfermented cheese is allowed to ferment to produce a fermented cheese having a desired pH generally less than about 5.5.

The solids level and the texture of the fermented cheese are controlled by adjusting the degree of milk clotting enzyme action on feed stock and the heat treatment to which the enzyme-treated feed stock is subjected. The solids level can exceed 70 percent by weight. Moreover, the control of solids level and texture in the process of this invention allows making of finished cheese with a variety of solid content and textures, such as Cheddar, Colby, Gouda and Monterey Jack.

The process of the present invention can produce, in a continuous manner, cheese containing both casein and soluble proteins without the need for inclusion of salt. Furthermore, the process of the present invention can produce high and very high solids cheese with varying texture without working of the cheese. However, the cheese can be further texturized. For example, further texturization can be effected by heating the cheese to a temperature in the range of about 120° F. to 170° F. with mechanical manipulations thereof. This additional working of the cheese produces cheese having a more stringy and firmer texture that can be useful for some applications.

B. Raw Materials for the Process

The process of the present invention can be carried out on any feed stock containing unrenneted casein. Important advantages over the conventional process are achieved when the feed stock contains high levels of soluble proteins in addition to unrenneted casein. Generally, the soluble proteins are in the form of whey proteins. The feed stock can be prepared in any desirable manner. For example, it can be derived from a naturally occurring substance such as milk. Also, it can be synthesized by combining the necessary ingredients. For example, a feed stock liquid can be prepared by reconstituting ingredients such as sodium or calcium caseinate, fat of dairy or non-dairy origin; whey proteins, carbohydrates, minerals and vitamins.

Generally, the pH of the prepared feed stock should be in the range of 6.5 to 6.7, but it can be adjusted, if needed, depending on the composition and ingredients used in the feed stock. The preferred feed stock is derived from milk and most preferably from cows' milk. The use of whole milk for the preparation of the feed stock is especially preferred.

The desired composition of the feed stock is preferably achieved by ultrafiltration and diafiltration to produce a retentate. Thus, the preferred feed stock can be a retentate produced by ultrafiltration and diafiltration of milk, especially cows' milk, and preferably whole milk.

During the process of the present invention neither protein nor butterfat is normally removed from the feed stock. Accordingly, if a specific ratio of protein to butterfat is desired in the final product such ratio is preferably established before the feed stock is formed. For example, a Cheddar cheese (having 50.5 to 51.5% fat in dry matter) produced in accordance with this invention requires a protein/fat ratio in the whole milk equivalent to 0.63 to 0.64 when measured as casein/fat ratio by the Walker Casein Test. The adjustment of the protein to fat ratio can be achieved by either adding or removing one of these components.

In situations where it is preferred to ultrafilter skim or part-skim milk, protein to fat ratio of the final product may be adjusted by an appropriate incorporation of milkfat in the form of cream, anhydrous milkfat, or butter, at any stage after ultrafiltration.

Although the process of the present invention does not require the use of a salt, salt may nevertheless be added during the process to achieve the desired salt level in the final product. Preferably, the salt is added in either dry or brine form prior to evaporation and most preferably, just prior to the introduction of the milk clotting enzyme (such as a rennet) into the feed stock. The amount of salt added is generally less than about two percent by weight of the feed stock.

The feed stock having the desired proportion of ingredients but excess of water is combined with milk clotting enzymes capable of converting the Kappa casein to para Kappa casein. The milk clotting enzymes can be animal, microbial, plant or mixtures thereof. The enzyme preferred for best performance are: calf rennet, porcine pepsin and microbial rennets.

The amount of enzyme added varies depending on the composition of the feed stock, time allowed for controlled enzymatic action on the feed stock, the texture and solids level desired in the final product and the heat treatment to which the feed stock is subsequently subjected. Generally, the enzyme addition levels are in the range of 0.05% to 0.50% by weight of the feed stock.

DESCRIPTION OF THE PREFERRED EMBODIMENT OF THE INVENTION

Figure 2:
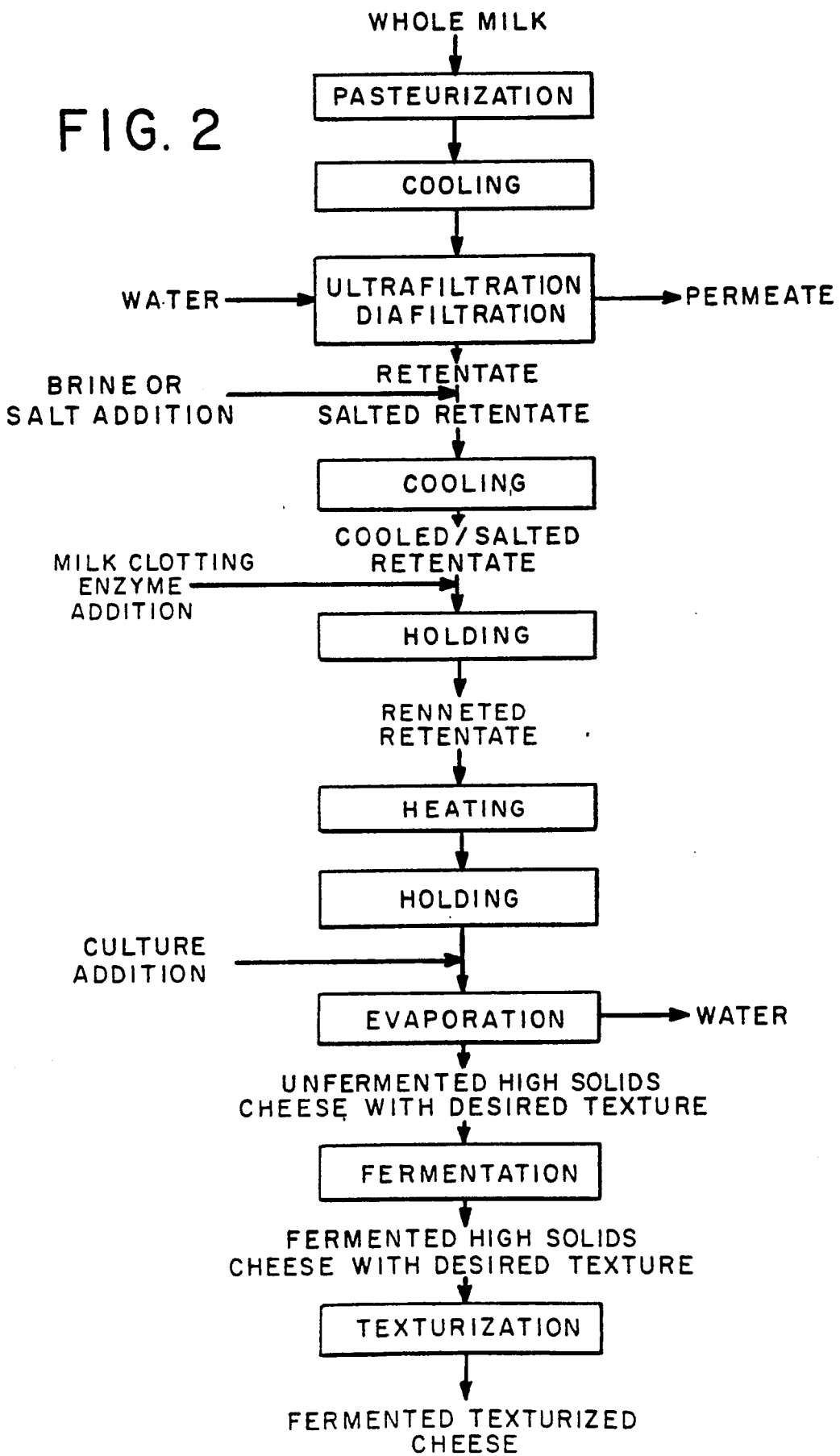
FIG. 2 depicts a flow diagram of a preferred embodiment of the process of the present invention.

The invention will now be described in connection with the preferred embodiment depicted in FIGS. 2–5. As shown in FIG. 2, to make the feed stock, whole milk at a temperature in the range of about 35°–40° F. is pasteurized by heating it to a temperature of 161° F. and maintaining it at that temperature for about 15 seconds. The pasteurized milk is then cooled to a temperature of about 120° F. and subjected to ultrafiltration and diafiltration in order to achieve the required composition in the resulting retentate. The permeate is removed and the retentate is used as the feed stock of this preferred embodiment.

The purpose of ultrafiltration/diafiltration step is to achieve the desired levels of moisture and lactose in the retentate. The precise moisture level depends on the desired moisture in the final product and the cost of removal of the moisture by ultrafiltration as opposed to evaporation. While the process can be operated in a concentration ratio of from 1:1 to 9:1, a concentration ratio of from 3:1 to 6:1 compared to the original milk is preferred.

The reason for adjusting the level of lactose is that the ratio of buffer capacity to lactose affects the pH of the final product.

The ratio of buffer capacity to lactose is, in turn, controlled by the manner of preparation of the retentate, i.e. in the preferred process by a combination of the extent of diafiltration and the degree of ultrafiltration (concentration) of the retentate.

The desired buffer capacity to lactose ratio can be achieved in any desired manner. In batch mode, the combined ultrafiltration and diafiltration treatment can be carried out using the following steps:

(1) concentrating whole milk by ultrafiltration until about 40% to 60% by weight of the milk has been removed as the permeate fraction;

(2) subjecting the retentate fraction to diafiltration, preferably continued until the amount of water added is from 15 to 91% of the weight of the original milk; and (3) resuming and continuing ultrafiltration until the retentate fraction amounts to about 20% to 30% of the weight of the original milk.

The preferred mode of combined ultrafiltration and diafiltration treatment is a continuous four stage system. The four-stages-in-series ultrafiltration feed and bleed system employs continuous water injection into the last three stages. With the preset volume reduction ratio of about 5.2 in concentrating whole milk, the amount of water injected into the second, third and fourth stage of the system is about 17%, 13% and 3%, respectively, of the weight of the incoming milk.

The resulting retentate is generally at a temperature of about 120° F. before cooling. The pH of the retentate is about 6.6 with a typical composition as follows:

| Component | Concentration (%) |
| --- | --- |
| Lactose | 1.1 |
| Protein | 17.8 |
| Non-protein Nitrogen | 0.3 |
| Ash | 1.6 |
| Fat | 21.9 |
| Total Solids | 42.7 |

As shown in FIG. 2 the next step in the process of the preferred embodiment of this invention is the addition of salt, i.e. sodium chloride. This step is not required for the process to be operational. If no salt is desired in the final product, this step can be entirely omitted. If salt is desired in the final product, it can be added at this point of the process or at any other convenient point of the process. The addition of salt prior to the formation of cheese, results in an important advantage. Namely, the solid cheese need not be subjected to the conventional brining procedure which is time-consuming, expensive and which produces non-uniformly salted product.

The amount of salt added should not exceed the amount that would produce the desired salt concentration in the final product. Generally less than about two percent of salt by weight of the unsalted retentate is added to the retentate to produce a salted retentate. The salted retentate is then cooled down to about 90° F.

In the next step of this preferred embodiment milk clotting enzyme is introduced into the salted retentate, preferably by injection. For economic reasons, the preferred milk clotting enzyme in a commercial operation is microbial rennet such as Chris Hansen's single strength Hannilase derived from Mucor meheii. If economic factors are not important, the preferred enzyme is calf rennet. The amount of milk clotting enzyme added and the holding time period allowed for enzyme action determine the final degree of the enzyme action on retentate. The degree of enzyme action on retentate is assessed by the coagulation time measured from the retentate collected immediately before the heat treatment. The shorter the coagulation time measured, the higher the degree of enzyme action on the retentate.

Following enzyme treatment, the retentate is heated to a temperature in the range from about 120° to about 300° F. and held at this temperature for a period of time in the range of about 0.1 second to about 600 seconds. Typically, the retentate is held for a time period from about 10 to about 200 seconds, at the temperature in the range from about 140° F. to about 200° F.

Following heat treatment, culture is injected into the retentate and the excess water is removed in an agitated thin film evaporator to produce an unfermented high solids cheese with the desired texture.

This cheese is then allowed to ferment at a temperature of about 75° F. for 48 hours to produce high solids fermented cheese having the pH less than 5.5.

The extent of enzyme action, the degree of heat treatment and the evaporation conditions can be uniquely combined to produce a wide variety of high solids cheeses with the required textural and organoleptic characteristics.

Figure 3:
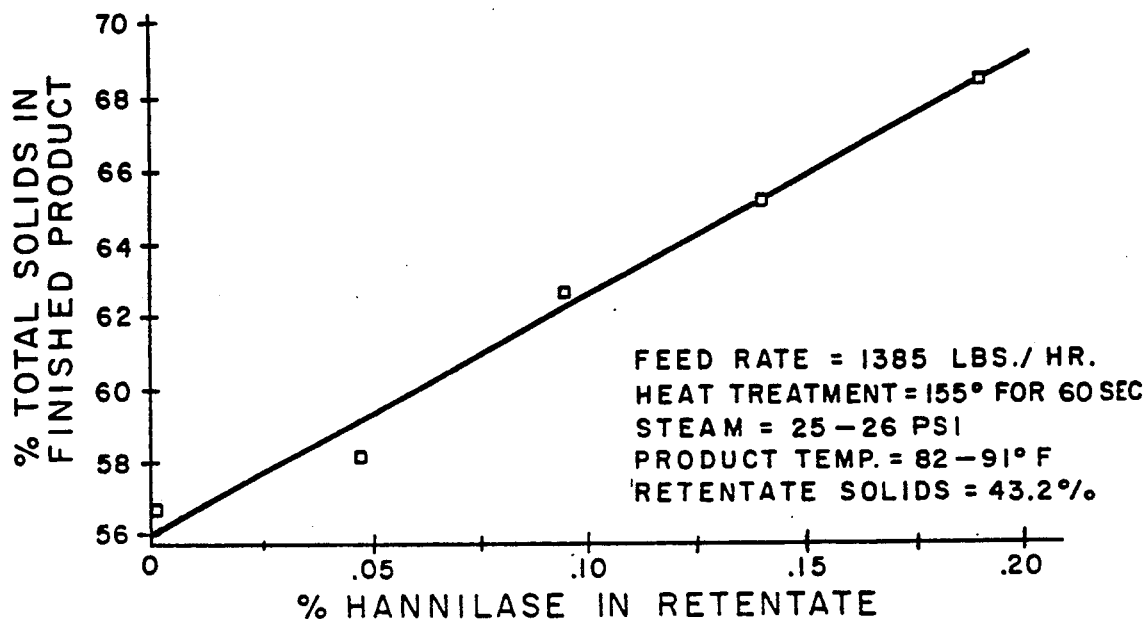
FIG. 3 is a diagram showing the effects of the amount of a milk clotting enzyme on the cheese solids content in the finished product when using the process of the preferred embodiment depicted in FIG. 2.
Figure 4:
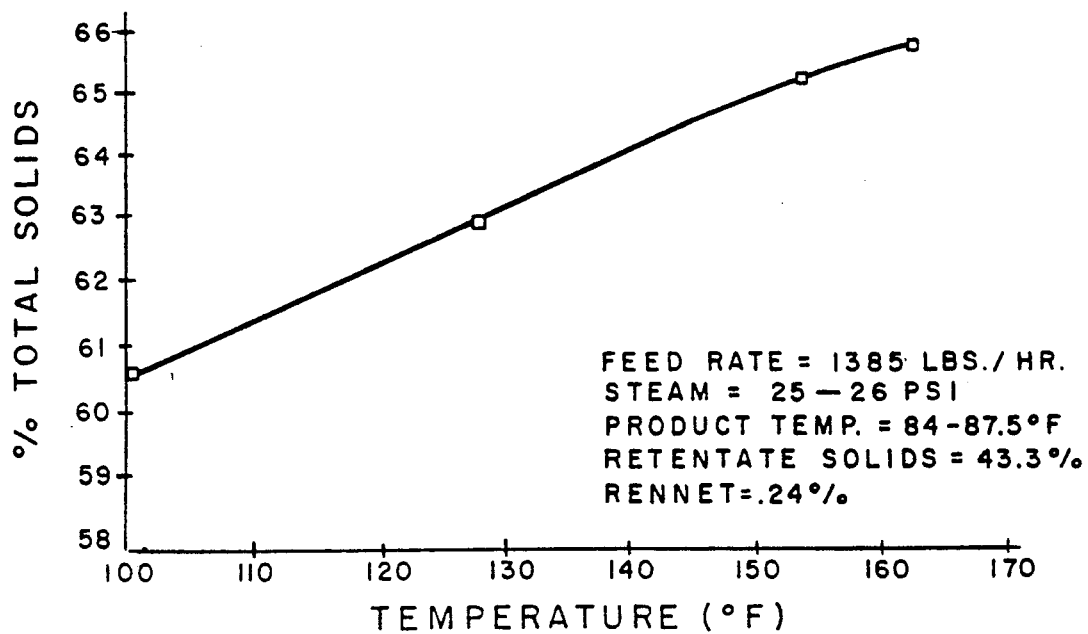
FIG. 4 is a diagram showing the effect of the temperature in the heat treatment step on the cheese solids content of finished cheese product in the process of the preferred embodiment depicted in FIG. 2.
Figure 5:
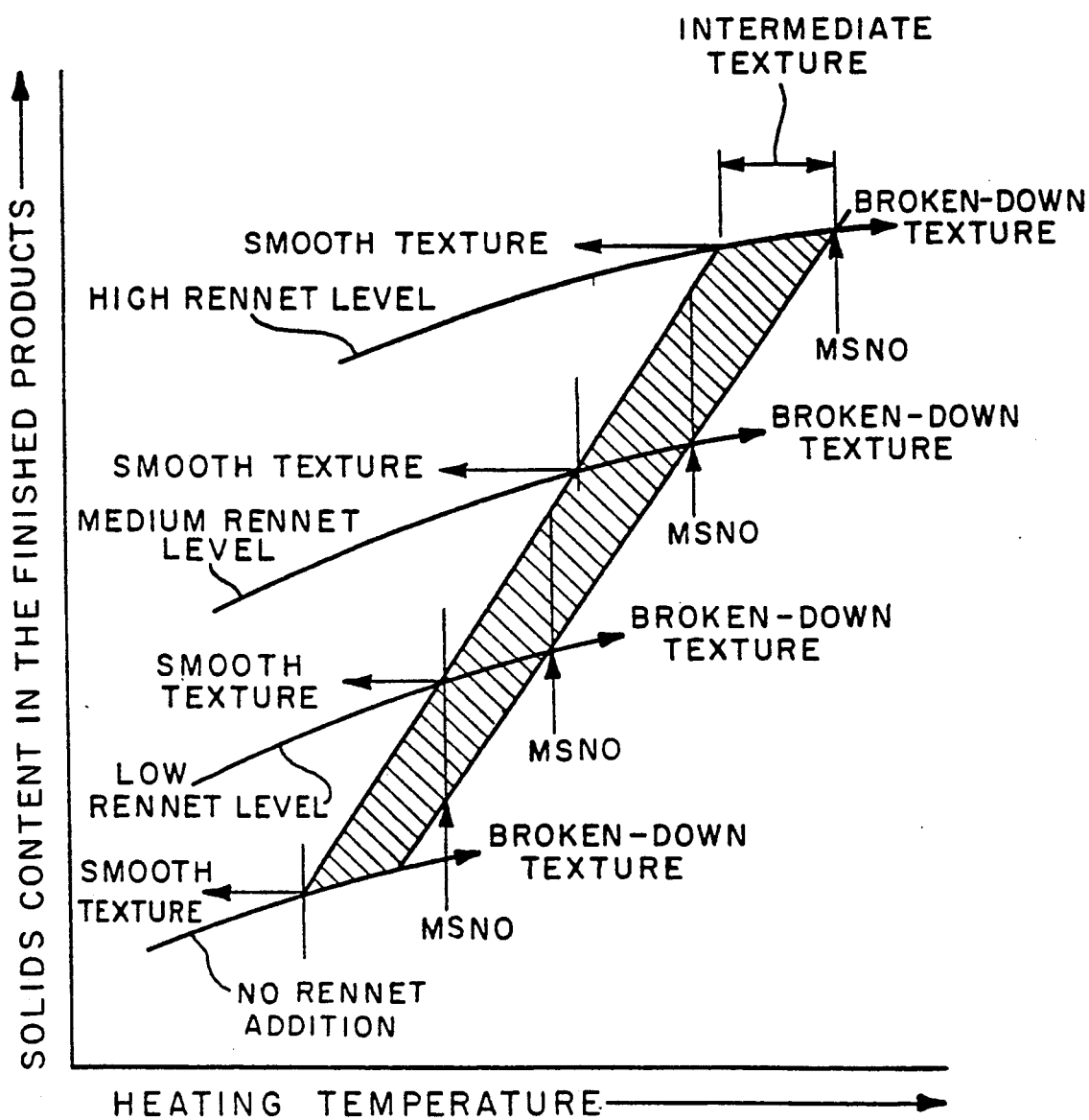
FIG. 5 is a graphical representation of the texture control and development of final cheese as a function of solids contents, the temperature in the heating step and rennet or other milk clotting enzyme levels in the process of the preferred embodiment depicted in FIG. 2.

FIG. 3 depicts the effect of a microbial rennet (Chris Hansen's Hannilase) on the final cheese solids content achieved during evaporation. At a fixed heat treatment condition of 155° F. for about 60 seconds, and an allowed rennet reaction time of about 60 seconds, the higher the Hannilase dosage level is applied, the higher finished cheese solids level is achieved. FIG. 4 demonstrates the effect of heat treatment of the Hannilase-treated retentate on the final cheese solids content achieved during evaporation. At a fixed 0.24% Hannilase dosage level for about 60 seconds and a fixed heating time of about 60 seconds the higher temperature the greater ease in removing the moisture from the retentate. The distinct advantage of this unique combination of on-line milk clotting enzyme addition and heat treatment of retentate is that it can produce unfermented cheese having very high solids content with varying texture.

Heat treatment step in this preferred embodiment also serves to deactivate the added enzyme activity to ensure that no detrimental effects result from the residual enzyme activity in the finished cheese during subsequent storage. High residual enzyme activity causes a watery discharge from the cheese during storage and this defect is known as "wheying off." Furthermore, high residual enzyme activity also causes undesirable protein breakdown in the fermented cheese during storage. Such undesirable protein breakdown results in finished cheese with a softer body. For best results, it has been found that heat treatment at temperatures above 155° F. with a 60 second holding time gives an acceptable finished product. The effects of heat treatment on the residual Hannilase activity in the finished cheese, analyzed 4 days after evaporation, are shown as follows:

| | | FINISHED CHEESE | |
|---|---|---|---|
| Temperature[a] (°F.) | Wheying Off Defect | Protein Breakdown Non-Protein Nitrogen Values (mg/100 g cheese) | % Residual[b] Hannilase Activity |
| 96 (Control, no heat treatment applied) | Severe | 262 | 100 |
| 125 | Severe | 236 | 83 |
| 139 | Slight | 219 | 67 |
| 155 | None | 154 | 10 |

[a] Heat treatment with holding time of 60 seconds.
[b] As compared to the Control, activity was measured by the diffusion test described by Holmes, et al. (1977) in J. Dairy Science 60:802.

In accordance with further aspects of the present invention, the desired texture of the finished cheese can be controlled by adjusting the process pressure at which evaporation takes place, the degree of milk clotting enzyme actions on retentate and the heat treatment to which the enzyme-treated retentate is subjected. An MSNO (maximum solids level with no oiling off) phenomena was noted during the texture development by adjusting the above mentioned process variables. The diagram for the discovered MSNO/texture development is depicted in the FIG. 5. The milk clotting enzyme action on the retentate influences the finished product in such a way that it can retain oil at a higher solids level. The maximum solids level of a product with no observed oiling off phenomena is defined as MSNO. A product with a solids content much higher than its MSNO results in an oily and broken-down texture, whereas a product with a solids content much lower than its MSNO results in very smooth and pasty characteristics. Product which exists between the smooth and MSNO texture is defined as having "Intermediate" texture. This "Intermediate" unfermented product had a rubbery, rough but not oily texture when evaluated at the evaporator discharge.

After fermentation the fermented "Intermediate" texture cheese has similar texture to conventional Cheddar and is much less adhesive and pasty than the cheese as derived from the commercial Jameson, et al., process. Heat treatment of the milk clotting enzyme-treated retentate plays an important role in controlling texture in the finished cheese. As the temperature is increased, the product moves towards the MSNO state, whereas the product moves towards smooth texture as the temperature is decreased. Process pressure during evaporation also controls the texture in the finished product. As the process pressure is decreased, the product moves towards MSNO state, whereas the product moves to the smooth texture as the process pressure is increased. The above three processing variables cannot be used independently of the others in achieving and controlling the desirable finished cheese texture. The degree of milk clotting enzyme actions on the retentate predetermines the MSNO of the final product. With the slight adjustment of the process pressure of the evaporator and the heat treatment applied to the enzyme-treated retentate, cheese with a variety of texture characteristics at any given solids level can be easily produced and controlled.

Flavor producing enzymes and/or flavor producing cultures can be added along with the lactic culture preparation to accelerate the ripening of the fermented high solids cheese.

If desired, the fermented cheese at pH lower than 5.5 can be further texturized by conventional treatments. For example, it can be heated in a Rietz cooker to a temperature in the range of 120° F. to about 170° F. with mechanical manipulation thereof. This further texturization process produces cheese having a firmer, more stringy Mozzarella-like texture.

In accordance with another aspect of the present invention, the type of lactic culture and the salt level in the moisture phase of the final product can be adjusted to control the fermentation and, hence, the final pH of the cheese. For example, Miles M30 direct set culture was used to ferment the product with various levels of salt in the moisture phase. A range of final pH values resulted as shown.

| Salt in Moisture Phase of Cheese | pH of Fermented Cheese |
|---|---|
| 0.0 | 5.32 |
| 0.8 | 5.38 |
| 1.7 | 5.38 |
| 2.5 | 5.44 |
| 3.4 | 5.59 |
| 4.2 | 5.78 |
| 5.2 | 5.91 |

However, when Nordica Bulk Set Culture 106B was used to ferment the cheese, a final pH of 5.2 was reached when the finished cheese contained 2.4% salt in the moisture phase of the product. Both the unfermented and fermented cheese can also be used as the natural cheese ingredient in making of process cheese, processed cheese, and other cheese products using the same methods that had been employed for making such cheese from conventional natural cheese.

EXAMPLES

The following examples are provided for illustrative purposes. They are not intended to limit the present invention.

EXAMPLE 1

Standardization of raw milk was achieved by the addition of cream. 1870 lbs. of 40% pasteurized cream was added to 88,000 lbs. of raw milk containing 3.40% fat and 3.09% protein. Such amount of cream addition yielded about 54% fat in dry matter (FDM) in the finished cheese. The standardized milk was pasteurized at 161° F., then cooled down to 120° F. before subjecting it to the membrane ultrafiltration process. An Abcor spiral wound 4-stage continuous ultrafiltration unit was used. The ultrafiltration/diafiltration process was operated at about 125° F. After 5.20-fold volume concentration of the standardized milk, the retentate had 43.7% total solids with a pH of 6.62. The diafiltration process reduced the lactose content in the retentate to 1.15%.

Saturated brine was injected into the 120° F. retentate stream before cooling down to 90° F. The salted retentate at 90° F. was then transferred to a 750 gallon holding tank. The brine solution was continuously injected in an amount such that final salt content in the retentate was at 0.35%. Thirty minutes after the ultrafiltration/diafiltration started, the fresh salted retentate (pH=6.62) was continuously drawn from the 750 gallon holding tank to a Luwa Model GMB Processor 0200 thin film evaporator.

Retentate was fed into the evaporator at a rate of 1483 lbs. per hour. A milk clotting enzyme, Chris Hansen's single strength Hannilase derived from Mucor meheii, was injected to the retentate line at a rate of 28 ml per minute. The above injection rate gave a Hannilase dosage level of 0.25% to the retentate The Hannilase treatment of retentate took place inside the pipe (2 inch diameter) before the retentate reach the heater at 155° F. The Hannilase reaction time with retentate was about 60 seconds. The degree of Hannilase action on the retentate immediately prior to heating was measured by the time required to coagulate after the Hannilase-treated retentate sample was collected from the sampling port which is located immediately before the heater. The shorter the coagulation time measured, the higher the degree of the Hannilase action on the retentate. In this example, a 30 second coagulation time was observed. Heating the Hannilase-treated retentate at 155° F. occurred for about 60 seconds before the retentate reached the evaporator. The evaporator vacuum was selected so that the product temperature was 90° F. at the evaporator discharge. A conventional frozen lactic starter culture preparation (Culture No. 925) sold by Chris Hansen. Inc. of Milwaukee, Wis. was used in preparing a bulk starter culture with media (Sentry 75) sold by Nordica Inc. of Sioux Falls, S. Dak. The bulk culture was injected into the Hannilase and heat-treated retentate stream at a rate of 200 ml per minute. The culture injection port was located near the inlet of the feed stream to the evaporator. Due to the extremely short time of exposure to the feed before it flashed under vacuum, there was no observed loss of culture activity. A rubbery and elastic, curdy texturized product was discharged from the evaporator at a high solids content level of 66.90%.

The pH of the unfermented high solids cheese was the same as the fresh retentate at 6.62. This product was packed into a 500 lb. barrel or 20 lb. block hoop and then was pressed at 20 psi for 10 min. The product in the barrel or block was then stored in a 75° F. incubation room for 48 hours to allow further lactic fermentation. The final pH of the fermented product was 5.30. The pressed cheese was then stored at 40° F. The cheese, after cooling down, had the body and texture of conventional Cheddar.

EXAMPLE 2

A 10 pound process cheese formula blend was prepared as follows. The cheese obtained from the procedure in Example 1 was used as 100% of the cheese ingredient in the formula. Sodium citrate and trisodium phosphate were used as emulsifying agents. Glacial acetic acid was used as an acidifying agent. Water, salt and coloring agents were also included in the blend. With indirect steam jacket heating, the blend was successfully cooked into a homogenous mass at about 175° F. inside a Rietz cooker. The finished process cheese had acceptable body, flavor and melt characteristics.

EXAMPLE 3

The cheese obtained by the procedure of Example 1 was stored at 40° F. for normal curing. Typical Cheddar flavor was developed after storage for about 2 months. The cheese had the body and texture of conventional Cheddar and was used for cutting.

EXAMPLE 4

The procedure of Example 1 was followed except that commercial flavor producing cultures and protease/lipase preparations were injected along with the culture. These enzymes were used to hydrolyze the protein and fat in the finished cheese, and thus accelerate the ripening process and enhance the flavor. A typical sharp Cheddar flavor was developed in 4 weeks during the storage of the cheese at 40° F. This cheese also had the body and texture of conventional sharp Cheddar and could be used for cutting.

EXAMPLE 5

Mozzarella-like stringy texture was obtained by texturizing the fermented cheese (pH 5.26) obtained from the procedure of Example 1. The texturization was achieved by mechanically manipulating the cheese at elevated temperature. Specifically, 10 lbs. of cheese was worked inside a #10 size Rietz cooker with steam jacket heating. The Rietz auger speed was set at 220 rpm. The Mozzarella-like stringy texture was developed as follows:

| Time (min.) | Temperature (°F.) | Comment |
| --- | --- | --- |
| 0 (Start) | 71 | Crumbly, rough. |
| 1 min. | 80 | Slightly oily, soft mashed potato texture. |
| 2 min. | 100 | Slightly oily, doughy texture. Formed some string texture on the side of the cooker. |
| 3 min. | 115 | Large lump formed. Slightly stretchy characteristic. |
| 4 min. | 126 | Slightly shiny surface Slightly stretchy. |
| 5 min. | 132 | Slightly stretchy. |
| 6 min. | 140 | Stretchy curd formed in large lumpy pieces. |
| 7 min. | 150 | Large homogenous stretchy mass formed. |

The homogenous stringy texture was discharge at 150° F. with no oiling off. The ability of the fermented cheese to be successfully texturized into Mozzarella-like texture was defined by the pH and soluble calcium level in the system. The relationship between pH, soluble calcium and the stringy, stretchy characteristics during texturization were found as follows:

| pH | Soluble Calcium mg/100 g Cheese | Development of Stretchy/Stringy Characteristics |
| --- | --- | --- |
| 6.40 | 140.7 | Not achieved. |
| 6.00 | 169.3 | Not achieved. |
| 5.57 | 333.9 | Slightly stretchy and stringy. |
| 5.26 | 465.0 | Very stretchy and stringy. |

Many changes and modifications will occur to those skilled in the art upon studying this disclosure. All such changes and modifications that fall within the spirit of this invention are intended to be included within the scope of the claims.

We claim:

1. A process for making a high or a very high solids content cheese having the body and the texture of a conventional cheese but containing both casein and soluble proteins, from a feed stock which comprises unrenneted casein, soluble proteins, water and other cheese ingredients in the required proportions, on a dry basis, desired in the cheese, said process comprising the following sequential steps:
  (a) reacting a coagulating amount of a milk clotting enzyme with said feed stock; then
  (b) heating the feed stock for a time period sufficient to coagulate it and to substantially deactivate said enzyme;
  (c) removing water substantially without removing soluble proteins from the coagulated feed stock to produce cheese which contains casein and substantially all of the soluble proteins present in the feed stock but has the body and the texture of a conventional natural cheese, steps (a) and (b) allowing the removal of sufficient water to bring the solids content of said cheese to above about sixty percent by weight.

2. The process of claim 1 further comprising the step of adding an acid producing agent to the coagulated feed stock prior to removing water and the step of allowing the acid producing agent to lower the pH of cheese.

3. The process of claim 2 wherein said acid producing agent comprises lactic cultures.

4. The process of claim 1 wherein the milk clotting enzyme is a rennet.

5. The product made by the process of claim 1, 2, 3 or 4.

6. A process for making a fermented high or very high solids cheese containing both casein and soluble proteins but having the body and the texture of a conventional natural cheese, from a feed stock which comprises unrenneted casein, soluble proteins and other cheese ingredients in the required proportions, on a dry basis, desired in the cheese, said process comprising the following sequential steps:
  (a) reacting a coagulating amount of a milk clotting enzyme with said feed stock; then
  (b) heating the feed stock to an elevated temperature for a time period sufficient to substantially coagulate it and substantially deactivate said enzyme;
  (c) adding lactic cultures to the coagulated feed stock;
  (d) removing water to produce an unfermented cheese; and
  (e) allowing the lactic cultures to ferment said unfermented cheese to produce said fermented cheese which contains casein and substantially all of the soluble proteins present in the feed stock and has the body and the texture of a conventional natural cheese.

7. The process of claim 6 wherein the milk clotting enzyme is a rennet.

8. The process of claim 7 wherein the heating time period is in the range from about 0.1 second to about 600 seconds and the temperature is in the range from about 120° F. to about 300° F.

9. The process of claim 7 wherein the heating time period is in the range from about 10 seconds to about 200 seconds and the temperature is in the range from about 140° F. to about 200° F.

10. The process of claim 9 wherein the pH of said fermented cheese is less than about 5.5.

11. The product made by the process of claim 6, 7, 8, 9 or 10.

12. A process for making a fermented high or very high solids cheese having the body and the texture of a conventional natural cheese but containing casein and substantially all soluble proteins present in the feed stock, from a feed stock comprising unrenneted casein, soluble proteins and all the necessary cheese ingredients in the required proportions, on a dry basis, desired in the cheese, said process comprising:
  (a) reacting a milk clotting enzyme, the amount of said enzyme being in the range of about 0.05 to 0.5 percent by weight of said feed stock with said feed stock;
  (b) heating said enzyme-treated feed stock to a selected temperature in the range from about 120° F. to about 300° F. holding it at the selected temperature for a time period in the range of about 0.1 seconds to 600 seconds;
  (c) adding lactic cultures to the feed stock;
  (d) evaporating water from said feed stock to produce an unfermented cheese; and
  (e) allowing said lactic cultures to effect fermentation of said unfermented cheese to produce fermented cheese which contains casein and substantially all of the soluble proteins present in said feed stock, said cheese having the body and texture of a conventional cheese.

13. The process of claim 12 wherein the heating step comprises heating said feed stock to a temperature in the range from about 155° F. to about 185° F.

14. The process of claim 12 further comprising the step of cooling the feed stock prior to evaporating excess water.

15. The process of claim 12 wherein the step of evaporating is carried out continuously.

16. The process of claim 15 wherein the step of evaporating is carrier out in a thin film evaporator.

17. The process of claim 12 wherein the step of fermenting lowers the pH of the unfermented cheese to the range of about 5.0 to about 5.5.

18. The process of claim 12 further comprising adding flavor enhancing enzymes to the feed stock.

19. The process of claim 18 wherein the flavor enhancing enzymes and/or flavor enhancing cultures are added together with lactic cultures.

20. The product made by the process of claim 12, 13, 14, 15, 16, 17, 18 or 19.

21. A method for controlling the texture of cheese made from a feed stock containing unrenneted casein, whey proteins and other cheese ingredients in the required proportions, excluding water, by adding a milk clotting enzyme to said feed stock and holding it for a predetermined time period, heating the enzyme-treated feed stock for a predetermined time period to coagulate the feed stock; then adding lactic acid cultures to the feed stock, removing water to produce an unfermented cheese and allowing the lactic cultures to ferment said unfermented cheese to produce a fermented cheese, said method comprising:
  selecting the amount of milk clotting enzyme, the reaction time with feed stock, the temperature to and time at which said enzyme treated feed stock is heated and the amount of water removed.

* * * * *